US009722904B2

(12) United States Patent
Liu et al.

(10) Patent No.: US 9,722,904 B2
(45) Date of Patent: Aug. 1, 2017

(54) DETECTION METHOD AND DEVICE FOR LINK KEEP-ALIVE BETWEEN AC AND AP

(75) Inventors: Yang Liu, Shenzhen (CN); Yanguang Chi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 92 days.

(21) Appl. No.: 14/404,896

(22) PCT Filed: Jun. 28, 2012

(86) PCT No.: PCT/CN2012/077765
§ 371 (c)(1),
(2), (4) Date: Dec. 1, 2014

(87) PCT Pub. No.: WO2013/177841
PCT Pub. Date: Dec. 5, 2013

(65) Prior Publication Data
US 2015/0146544 A1 May 28, 2015

(30) Foreign Application Priority Data

May 31, 2012 (CN) .......................... 2012 1 0176746

(51) Int. Cl.
*H04L 12/26* (2006.01)
*H04L 1/08* (2006.01)
(Continued)

(52) U.S. Cl.
CPC ................ *H04L 43/10* (2013.01); *H04L 1/08* (2013.01); *H04L 1/188* (2013.01); *H04L 43/0811* (2013.01); *H04W 84/12* (2013.01)

(58) Field of Classification Search
None
See application file for complete search history.

(56) References Cited

U.S. PATENT DOCUMENTS 8,599,858 B1 * 12/2013 Mizrahi ................ H04L 45/026
370/395.31
2008/0072047 A1 3/2008 Sarikaya et al.

FOREIGN PATENT DOCUMENTS

CN   101051981 A   10/2007
CN   101917439     12/2010

OTHER PUBLICATIONS

International Search Report issued Mar. 7, 2013 re: Application No. PCT/CN2012/077765; citing: CN 101051981 A, CN 101917439 A and US 2008/0072047 A1.

(Continued)

*Primary Examiner* — Anh Ngoc Nguyen
(74) *Attorney, Agent, or Firm* — Cantor Colburn LLP

(57) ABSTRACT

Provided are a detection method and device for link keep-alive between an Access Controller (AC) and an Access Point (AP). The method includes: setting a maximum permissible heartbeat keep-alive failure number; and performing link keep-alive detection between the AC and the AP based on the maximum permissible heartbeat keep-alive failure number by virtue of a heartbeat message or message retransmission. By the solution, a maximum permissible heartbeat keep-alive failure number is set, and a maximum retransmission interval is set for link keep-alive detection between the AC and the AP based on the maximum permissible heartbeat keep-alive failure number and a heartbeat keep-alive period, so that the problem that the AP frequently gets offline and frequently re-accesses the AC due to link quality reduction to seriously impact user experiences can be effectively solved.

12 Claims, 5 Drawing Sheets

(51) Int. Cl.
    *H04W 84/12*     (2009.01)
    *H04L 1/18*     (2006.01)

(56) References Cited

OTHER PUBLICATIONS

English Translation of Abstract of CN101051981A.
English Translation of Abstract of CN101917439A.

\* cited by examiner

DETECTION METHOD AND DEVICE FOR LINK KEEP-ALIVE BETWEEN AC AND AP

TECHNICAL FIELD

The disclosure relates to the technical field of wireless communication, in particular to a detection method and device for link keep-alive between an Access Controller (AC) and an Access Point (AP) in a Wireless Local Area Network (WLAN).

BACKGROUND

Generally, a conventional WLAN adopts a thin AP architecture formed by an AP and an AC. Under such a thin AP architecture, the AC manages the AP in a unified way through a Control And Provisioning of Wireless Access Points Protocol (CAPWAP). As shown in FIG. 1, FIG. 1 is a networking diagram of a WLAN under a thin AP architecture in the related art, and the dotted line in FIG. 1 represents the CAPWAP.

CAPWAP defines two bases for judging an offline state of the AP by the AC. When one of the two bases is met, the AC can determine that the AP is offline.

1. The AC sets a heartbeat keep-alive timer, and determines that the AP is offline if a keep-alive message is not received from the AP within a keep-alive period.

2. After transmitting a request message, the AC needs to retransmit the request message before receiving a response message. A retransmission interval is initially 3 s, and is doubled after retransmission of each time. Moreover, a maximum retransmission interval does not exceed a half of the heartbeat keep-alive period, and the maximum number of retransmission times is 5. The AC determines that the AP is offline if the response message returned by the AP is not received after the request message transmitted by the AC is retransmitted.

In addition, the CAPWAP also defines a basis for judging an offline state of the AC by the AP.

Before a response message of a request message transmitted by the AP is received, the request message needs to be retransmitted. A retransmission interval is initially 3 s, and is doubled after retransmission of each time. Moreover, a maximum retransmission interval does not exceed a half of a heartbeat keep-alive period, and the maximum number of retransmission times is 5. The AP determines that the AC is offline if the response message returned by the AC is not received after the request message transmitted by the AP is retransmitted.

The AC deletes a connection with the AP after determining that the AP is offline. The AP deletes a connection with the AC after determining that the AC is offline. Under the two conditions, the AP can normally work only after re-accessing the AC. A process of re-access of the AP to the AC generally takes a few minutes. During this period, the AP cannot provide a service for a wireless user.

It can be seen from the above that, in a related art, the messages transmitted by the AP and the AC may be delayed or lost under the condition of link quality reduction or instability, and the AP will frequently get offline due to the detection of a keep-alive message or the retransmission response message within only one heartbeat keep-alive period. After getting offline, the AP can normally work only after re-accessing the AC, and the process of re-access of the AP to the AC probably will take a few minutes and even more. If frequently getting offline, the AP will be unavailable, which causes serious impact on user experiences.

SUMMARY

The embodiments of the disclosure provide a detection method and device for link keep-alive between an AC and an AP, so as to at least solve the problem that the AP frequently gets offline due to link quality reduction.

According to one embodiment of the disclosure, a detection method for link keep-alive between an AC and an AP is provided, which includes:

setting a maximum permissible heartbeat keep-alive failure number; and performing link keep-alive detection between the AC and the AP based on the maximum permissible heartbeat keep-alive failure number by virtue of a heartbeat message or message retransmission.

In the described embodiment, performing link keep-alive detection between the AC and the AP based on the maximum permissible heartbeat keep-alive failure number by virtue of the heartbeat message includes:

setting a heartbeat keep-alive period;

detecting whether the AC receives the heartbeat message transmitted by the AP or not within the heartbeat keep-alive period;

if the AC receives the heartbeat message transmitted by the AP within the heartbeat keep-alive period, clearing a heartbeat keep-alive failure number, restarting heartbeat keep-alive detection of a new round, otherwise adding 1 to the heartbeat keep-alive failure number;

when the heartbeat keep-alive failure number reaches the maximum permissible heartbeat keep-alive failure number, determining that heartbeat keep-alive fails and the AP is offline; and when the heartbeat keep-alive failure number does not reach the maximum permissible heartbeat keep-alive failure number, continuing performing heartbeat keep-alive detection within the maximum permissible heartbeat keep-alive failure number.

In the described embodiment, performing link keep-alive detection between the AC and the AP based on the maximum permissible heartbeat keep-alive failure number by virtue of message retransmission includes:

setting the heartbeat keep-alive period;

transmitting a first request message to the AP by the AC, and setting an initial retransmission timer;

judging whether the AC receives a first response message returned by the AP or not within a time length of the retransmission timer, and if the AC receives the first response message returned by the AP within the time length of the retransmission timer, determining that heartbeat keep-alive is normal; otherwise doubling the time length of the retransmission timer, judging whether the doubled time length is greater than a maximum retransmission interval or not, wherein the maximum retransmission interval=(the heartbeat keep-alive period*the maximum permissible heartbeat keep-alive failure number)/2, and if the doubled time length is greater than the maximum retransmission interval, determining that heartbeat keep-alive fails and the AP is offline; otherwise resetting the retransmission timer and retransmitting the first request message to the AP by the AC, and returning to the step of judging whether the AC receives the first response message returned by the AP or not within the time length of the retransmission timer.

In the described embodiment, the step of performing link keep-alive detection between the AC and the AP based on the maximum permissible heartbeat keep-alive failure number by virtue of the heartbeat message includes:

setting the heartbeat keep-alive period;

transmitting a second request message to the AC by the AP, and setting the initial retransmission timer;

judging whether the AP receives a second response message returned by the AC or not within the time length of the retransmission timer, and if the AP receives the second response message returned by the AC within the time length of the retransmission timer, determining that heartbeat keep-alive is normal; otherwise doubling the time length of the retransmission timer, judging whether the doubled time length is greater than the maximum retransmission interval or not, wherein the maximum retransmission interval=(the heartbeat keep-alive period*the maximum permissible heartbeat keep-alive failure number)/2, and if the doubled time length is greater than the maximum retransmission interval, determining that heartbeat keep-alive fails and the AC is offline; otherwise resetting the retransmission timer and retransmitting the second request message to the AC by the AP, and returning to the step of judging whether the AP receives the second response message returned by the AC or not within the time length of the retransmission timer.

In the described embodiment, the heartbeat keep-alive period is 30 to 80 seconds; and the maximum permissible heartbeat keep-alive failure number is 3 to 5.

According to another embodiment of the disclosure, a detection device for link keep-alive between an AC and an AP is also provided, which includes:

a setting module, configured to set a maximum permissible heartbeat keep-alive failure number; and a detection module, configured to perform link keep-alive detection between the AC and the AP based on the maximum permissible heartbeat keep-alive failure number by virtue of a heartbeat message or message retransmission.

In the described embodiment, the detection module is further configured to set a heartbeat keep-alive period; detect whether the AC receives the heartbeat message transmitted by the AP or not within the heartbeat keep-alive period; if the AC receives the heartbeat message transmitted by the AP within the heartbeat keep-alive period, clear a heartbeat keep-alive failure number and restart heartbeat keep-alive detection of a new round; otherwise add 1 to the heartbeat keep-alive failure number; when the heartbeat keep-alive failure number reaches the maximum permissible heartbeat keep-alive failure number, determine that heartbeat keep-alive fails and the AP is offline; and when the heartbeat keep-alive failure number does not reach the maximum permissible heartbeat keep-alive failure number, continue performing heartbeat keep-alive detection within the maximum permissible heartbeat keep-alive failure number.

In the described embodiment, the detection module is further configured to set the heartbeat keep-alive period; transmit a first request message to the AP by the AC, and set an initial retransmission timer; judge whether the AC receives a first response message returned by the AP or not within a time length of the retransmission timer; if the AC receives the first response message returned by the AP within the time length of the retransmission timer, determine that heartbeat keep-alive is normal; otherwise double the time length of the retransmission timer and judge whether the doubled time length is greater than a maximum retransmission interval or not, wherein the maximum retransmission interval=(the heartbeat keep-alive period*the maximum permissible heartbeat keep-alive failure number)/2; if the doubled time length is greater than the maximum retransmission interval, determine that heartbeat keep-alive fails and the AP is offline; otherwise reset the retransmission timer and retransmit the first request message to the AP by the AC, and return to judge whether the AC receives the first response message returned by the AP or not within the time length of the retransmission timer.

In the described embodiment, the detection module is further configured to set the heartbeat keep-alive period; transmit a second request message to the AC by the AP, and set the initial retransmission timer; judge whether the AP receives a second response message returned by the AC or not within the time length of the retransmission timer; if the AP receives the second response message returned by the AC within the time length of the retransmission timer, determine that heartbeat keep-alive is normal; otherwise double the time length of the retransmission timer and judge whether the doubled time length is greater than the maximum retransmission interval or not, wherein the maximum retransmission interval=(the heartbeat keep-alive period*the maximum permissible heartbeat keep-alive failure number)/2; if the doubled time length is greater than the maximum retransmission interval, determine that heartbeat keep-alive fails and the AC is offline; otherwise reset the retransmission timer and retransmit the second request message to the AC by the AP, and return to judge whether the AP receives the second response message returned by the AC or not within the time length of the retransmission timer.

In the described embodiment, the heartbeat keep-alive period is 30 to 80 seconds; and the maximum permissible heartbeat keep-alive failure number is 3 to 5.

By the detection method and device for link keep-alive between the AC and the AP provided by the embodiments of the disclosure, the maximum permissible heartbeat keep-alive failure number is set, and the maximum retransmission interval is set for link keep-alive detection between the AC and the AP based on the maximum permissible heartbeat keep-alive failure number and the heartbeat keep-alive period, so that the problem that the AP frequently gets offline and frequently re-accesses the AP due to link quality reduction to seriously impact user experiences can be effectively solved.

In order to make clearer the technical solution of the disclosure, description is given below with reference to the drawings in detail.

DETAILED DESCRIPTION OF THE EMBODIMENTS

A solution of the embodiments of the disclosure is mainly as follows: a maximum permissible heartbeat keep-alive failure number is set, and a maximum retransmission interval is set for link keep-alive detection between an AC and an AP based on the maximum permissible heartbeat keep-alive failure number and a heartbeat keep-alive period, so that the problem that the AP frequently gets offline and frequently re-accesses the AC due to link quality reduction to seriously impact user experiences is solved.

Figure 1:
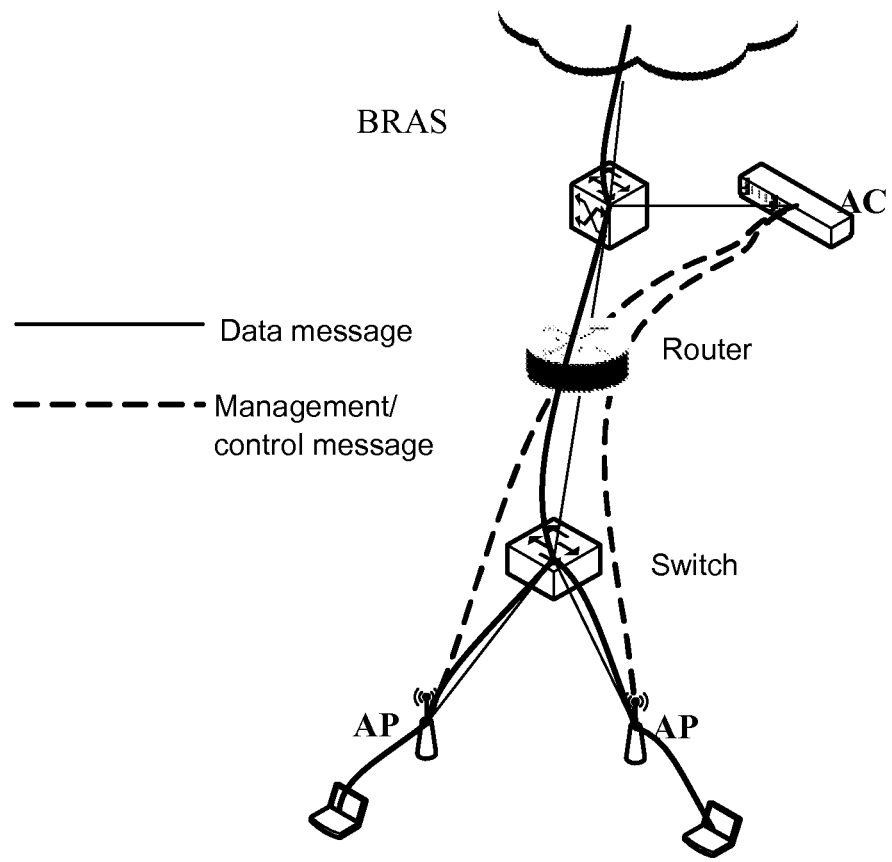
FIG. 1 is a networking diagram of a WLAN under thin AP architecture in a related art.
Figure 2:
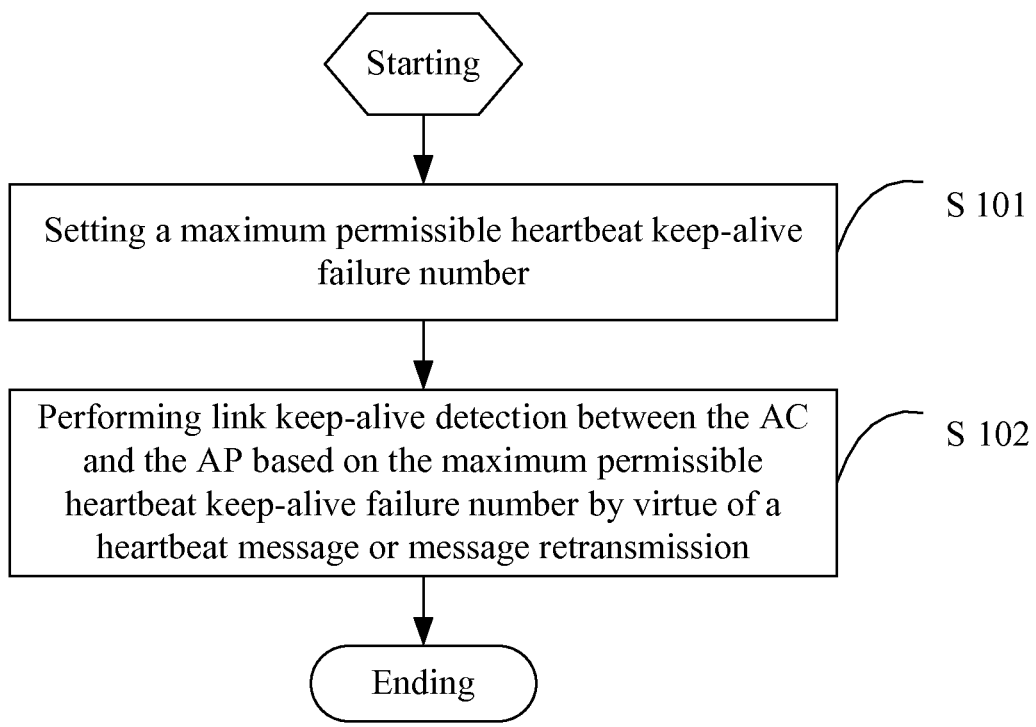
FIG. 2 is a flowchart of a detection method for link keep-alive between an AC and an AP according to an embodiment of the disclosure.

As shown in FIG. 2, an embodiment of the disclosure provides a detection method for link keep-alive between an AC and an AP, which includes steps as follows.

S101: A maximum permissible heartbeat keep-alive failure number is set.

In consideration that messages transmitted by the AP and the AC may be delayed or lost under the condition of link quality reduction or instability, and the AP will frequently get offline and unavailable due to the only detection of a keep-alive message or a retransmission response message within the heartbeat keep-alive period, which causes serious impact on user experiences. In order to avoid the condition, in the embodiment, the maximum permissible heartbeat keep-alive failure number is set, and link keep-alive between the AC and the AP is detected by virtue of the maximum permissible heartbeat keep-alive failure number and the heartbeat keep-alive period.

The maximum permissible heartbeat keep-alive failure number is applicable to both the AC and the AP, that is, the maximum permissible heart keep-alive failure number set on the AC and the AP may be kept consistent, and the same judgment standard is adopted on both sides.

During specific setting procedure of the maximum permissible heartbeat keep-alive failure number, a network condition during practical networking and a time length for the re-access of the AP may be taken into consideration. If the maximum permissible heartbeat keep-alive failure number is set to be excessively large, a time length for the AC/AP to detect an offline state of the opposite end is increased; and if the maximum permissible heartbeat keep-alive failure number is set to be excessively small, a failure that the AP frequently gets offline due to link quality reduction cannot be eliminated. In an example embodiment of the disclosure, the maximum permissible heartbeat keep-alive failure number is set to be 3 to 5.

S102: performing link keep-alive detection between the AC and the AP based on the maximum permissible heartbeat keep-alive failure number by virtue of a heartbeat message or message retransmission.

In the embodiment, when link keep-alive between the AC and the AP is detected based on the maximum permissible heartbeat keep-alive failure number, a heartbeat message or message transmission manner is specifically adopted; for an AC side, the AC can judge whether the AP is offline or not in both heartbeat message and message retransmission manners; and for an AP side, the AP can judge whether the AP is offline or not by virtue of message retransmission.

S102 in the embodiment is described with reference to three link detection manners, including the adoption of the heartbeat message and message retransmission manners by the AC and the adoption of the message retransmission manner by the AP, in detail.

Figure 3:
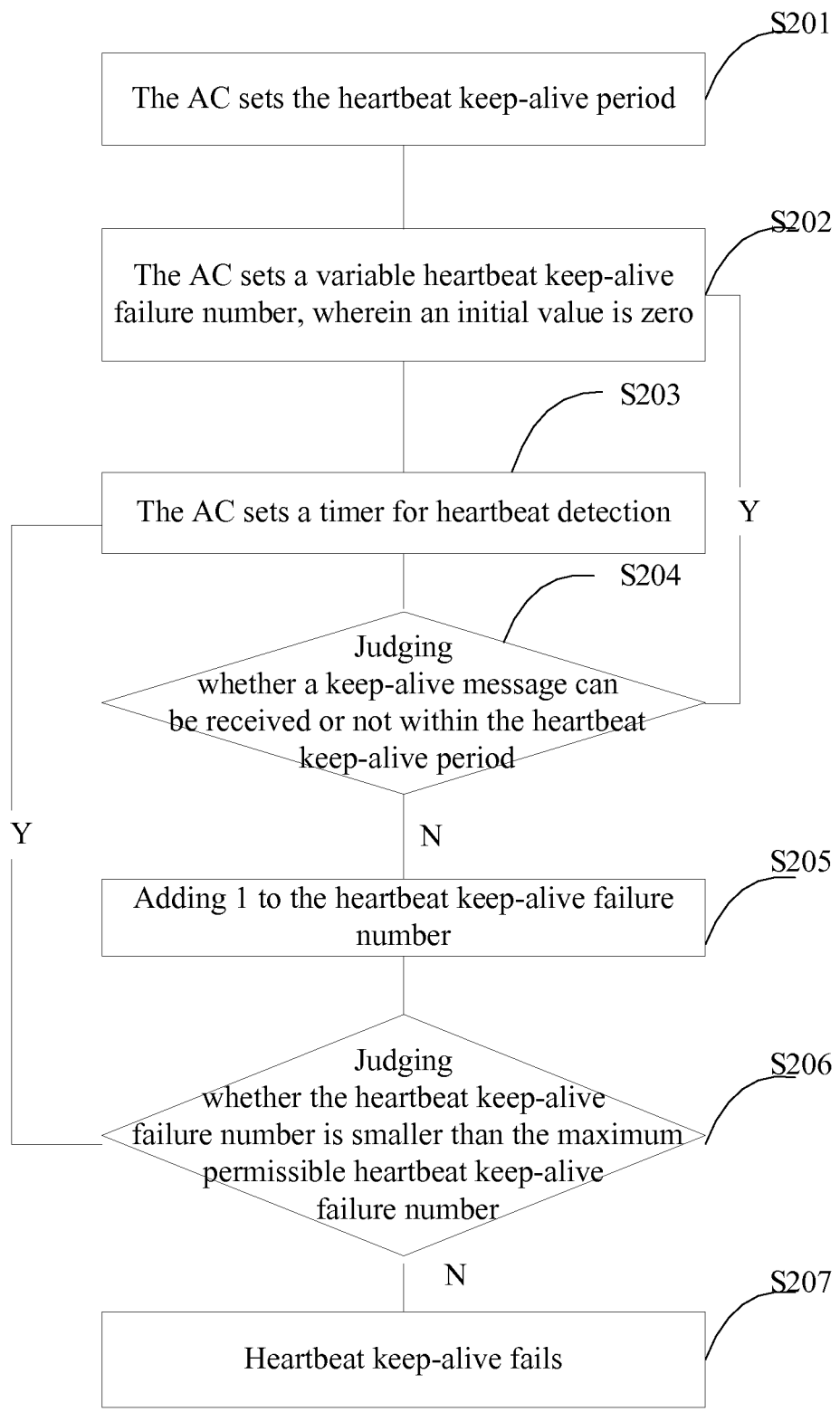
FIG. 3 is a flowchart of performing link detection by virtue of a heartbeat message by an AC in a detection method for link keep-alive between the AC and an AP according to an embodiment of the disclosure.

As shown in FIG. 3, when a first link detection manner (the AC performs link detection by virtue of the heartbeat message) is adopted, the step of performing link keep-alive detection between the AC and the AP based on the maximum permissible heartbeat keep-alive failure number by virtue of the heartbeat message includes that:

S201: the AC sets the heartbeat keep-alive period, wherein the period is ranged from 30 to 80 seconds;

S202: the AC sets a variable heartbeat keep-alive failure number, wherein an initial value is zero;

S203: the AC sets a timer for heartbeat detection;

S204: the AC detects whether a heartbeat keep-alive message (i.e. the heartbeat message called in the embodiment) transmitted by the AP can be received or not within the heartbeat keep-alive period, turns to S202 if the heartbeat keep-alive message transmitted by the AP can be received within the heartbeat keep-alive period, and restarts heartbeat keep-alive detection of a new round, and turns to S205 if the heartbeat keep-alive message transmitted by the AP cannot be received within the heartbeat keep-alive period;

S205: the AC adds 1 to the heartbeat keep-alive failure number;

S206: the AC judges whether the heartbeat keep-alive failure number is smaller than the maximum permissible heartbeat keep-alive failure number or not, turns to S203 and continues performing heartbeat keep-alive detection if the heartbeat keep-alive failure number is smaller than the maximum permissible heartbeat keep-alive failure number, and turns to S207 if the heartbeat keep-alive failure number is greater than or equal to the maximum permissible heartbeat keep-alive failure number; and S207: heartbeat keep-alive fails, and the AC determines that the AP is offline.

From the above solution, by the detection manner, the maximum permissible heartbeat keep-alive failure number is set, and link keep-alive detection within the heartbeat keep-alive period is cyclically performed within the range of the maximum permissible heartbeat keep-alive failure number if the AC does not receive the heartbeat keep-alive message transmitted by the AP within the heartbeat keep-alive period, so that the problem that the messages transmitted by the AP and the AC may be delayed or lost under the condition of link quality reduction or instability, and the AP will frequently get offline and frequently re-access the AP to cause reduction in the user experiences due to the only detection of the keep-alive message or the retransmission response message within the heartbeat keep-alive period is solved.

Figure 4:
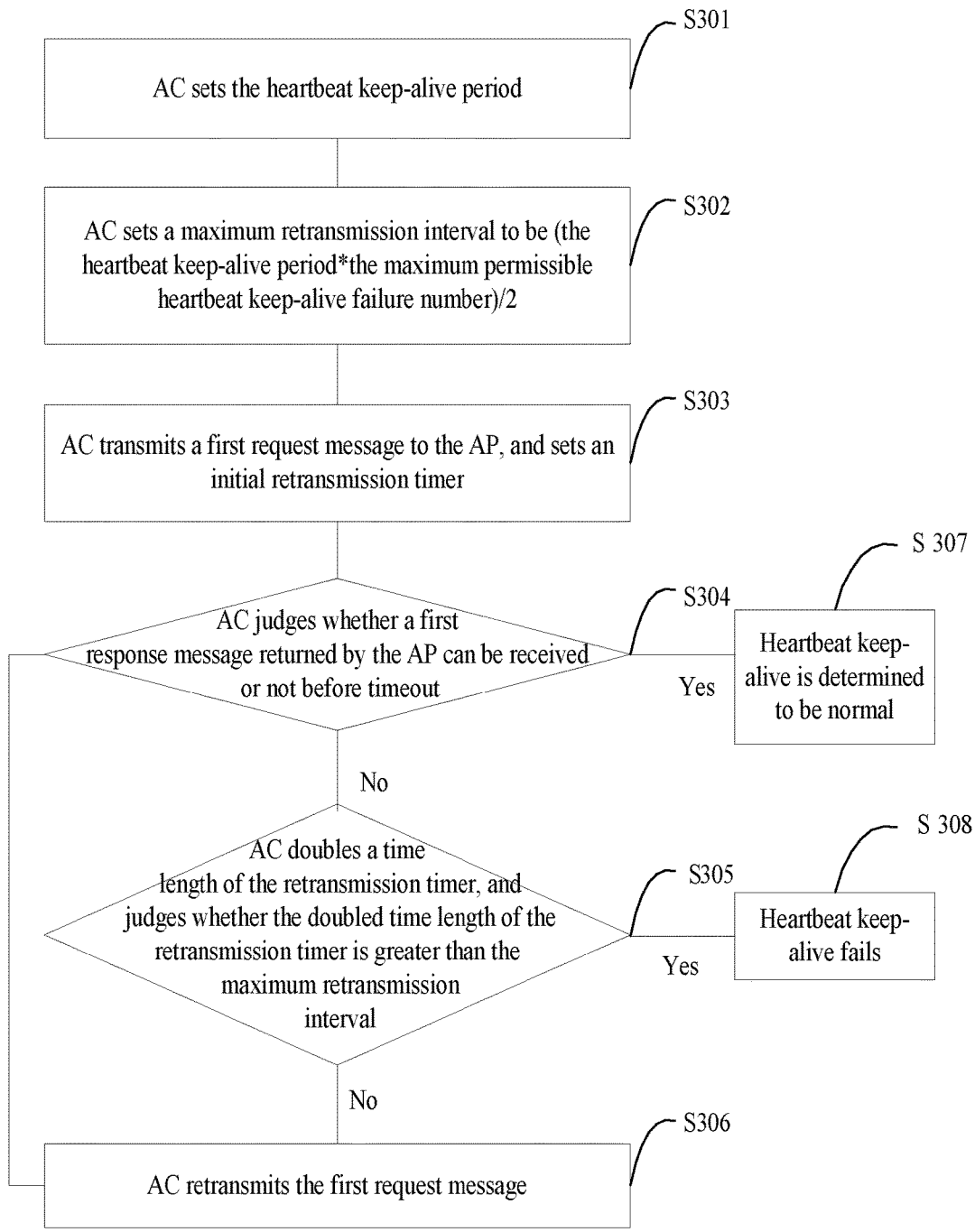
FIG. 4 is a flowchart of performing link detection by virtue of message retransmission by an AC in a detection method for link keep-alive between the AC and an AP according to an embodiment of the disclosure.

As shown in FIG. 4, when a second link detection manner (the AC performs link detection by virtue of message retransmission) is adopted, the step of performing link keep-alive detection between the AC and the AP based on the maximum permissible heartbeat keep-alive failure number by virtue of message retransmission in S102 includes that:

S301: the AC sets the heartbeat keep-alive period, wherein the period is ranged from 30 to 80 seconds;

S302: the AC sets a maximum retransmission interval to be (the heartbeat keep-alive period*the maximum permissible heartbeat keep-alive failure number)/2;

S303: the AC transmits a first request message to the AP, and sets an initial retransmission timer;

S304: the AC judges whether a first response message returned by the AP can be received or not before timeout, turns to S305 if the first response message returned by the AP cannot be received before timeout, and turns to S307 if the first response message returned by the AP can be received or not before timeout;

S305: the AC doubles a time length of the retransmission timer, judges whether the doubled time length of the retransmission timer is greater than the maximum retransmission interval or not, turns to S306 if the doubled time length is not greater than the maximum retransmission interval, and turns to S308 if the doubled time length is not greater than the maximum retransmission interval;

S306: the AC retransmits the first request message, and turns to S304;

S307: heartbeat keep-alive is determined to be normal; and

S308: heartbeat keep-alive fails, and the AC determines that the AP is offline.

From the above solution, by the detection manner, the maximum permissible heartbeat keep-alive failure number is set, the maximum retransmission interval is set to be (the heartbeat keep-alive period*the maximum permissible heartbeat keep-alive failure number)/2, and the first request message of the AC is cyclically retransmitted within the range of the maximum retransmission interval for link keep-alive detection, so that the problem that the messages transmitted by the AP and the AC may be delayed or lost under the condition of link quality reduction or instability, and the AP will frequently get offline and frequently re-access the AP to cause reduction in the user experiences due to the only detection of the keep-alive message or the retransmission response message within the heartbeat keep-alive period is solved.

Figure 5:
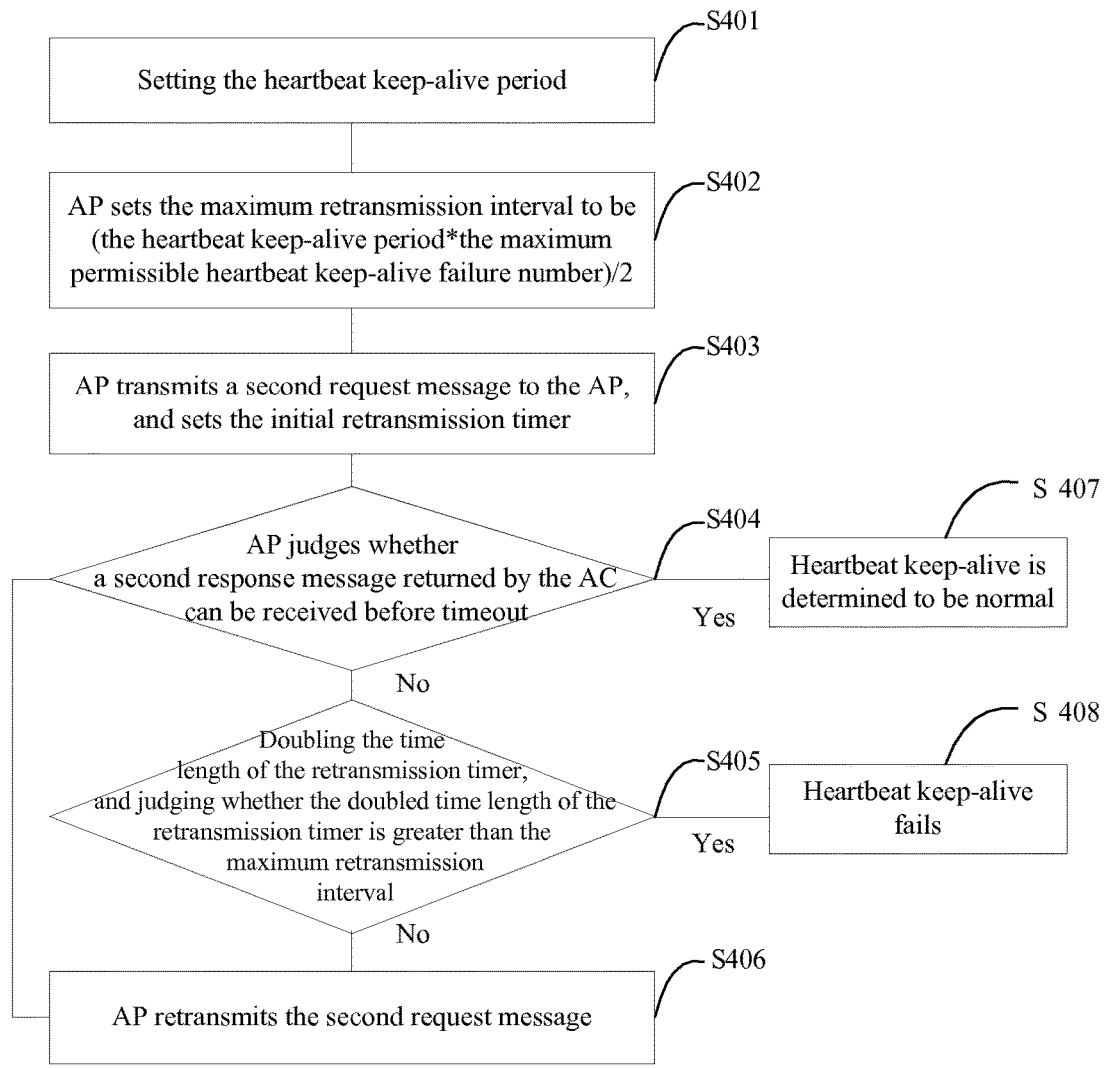
FIG. 5 is a flowchart of performing link detection by virtue of message retransmission by an AP in a detection method for link keep-alive between an AC and the AP according to an embodiment of the disclosure.

As shown in FIG. 5, when a third link detection manner (the AP performs link detection by virtue of message retransmission) is adopted, the step of performing link keep-alive detection between the AC and the AP based on the maximum permissible heartbeat keep-alive failure number by virtue of message retransmission includes:

S401: the AP sets the heartbeat keep-alive period, wherein the period is ranged from 30 to 80 seconds;

S402: the AP sets the maximum retransmission interval to be (the heartbeat keep-alive period*the maximum permissible heartbeat keep-alive failure number)/2;

S403: the AP transmits a second request message to the AC, and sets the initial retransmission timer;

S404: the AP judges whether a second response message returned by the AC can be received or not before timeout, turns to S405 if the second response message returned by the AC cannot be received before timeout, and turns to S407 if the second response message returned by the AC can be received before timeout;

S405: the AP doubles the time length of the retransmission timer, judges whether the doubled time length of the retransmission timer is greater than the maximum retransmission interval or not, turns to S406 if the doubled time length is not greater than the maximum retransmission interval, and turns to S408 if the doubled time length is not greater than the maximum retransmission interval;

S406: the AP retransmits the second request message, and turns to S404:

S407: heartbeat keep-alive is determined to be normal; and

S408: heartbeat keep-alive fails, and the AP determines that the AC is offline.

From the above solution, by the detection manner, the maximum permissible heartbeat keep-alive failure number is set, the maximum retransmission interval is set to be (the heartbeat keep-alive period*the maximum permissible heartbeat keep-alive failure number)/2, and the second request message of the AP is cyclically retransmitted within the range of the maximum retransmission interval for link keep-alive detection, so that the problem that the messages transmitted by the AP and the AC may be delayed or lost under the condition of link quality reduction or instability, and the AP will frequently get offline and frequently re-access the AP to cause reduction in the user experiences due to the only detection of the keep-alive message or the retransmission response message within the heartbeat keep-alive period is solved.

By the embodiment, the maximum permissible heartbeat keep-alive failure number is set, and the maximum retransmission interval is set for link keep-alive detection between the AC and the AP based on the maximum permissible heartbeat keep-alive failure number and the heartbeat keep-alive period, so that the problem that the AP frequently gets offline and frequently re-accesses the AP due to link quality reduction to seriously impact user experiences can be effectively solved.

Figure 6:
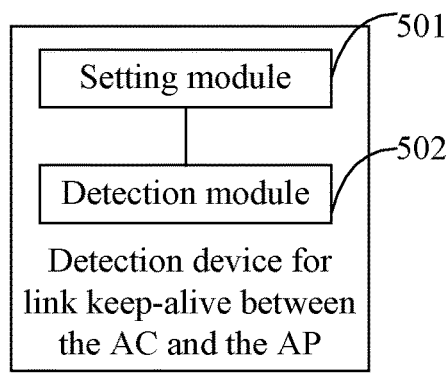
FIG. 6 is a structure diagram of a detection device for link keep-alive between an AC and an AP according to an embodiment of the disclosure.

As shown in FIG. 6, an embodiment of the disclosure provides a detection device for link keep-alive between an AC and an AP, which includes: a setting module 501 and a detection module 502, wherein:

the setting module 501 is configured to set a maximum permissible heartbeat keep-alive failure number; and the detection module 502 is configured to perform link keep-alive detection between the AC and the AP based on the maximum permissible heartbeat keep-alive failure number by virtue of a heartbeat message or message retransmission.

In consideration that messages transmitted by the AP and the AC may be delayed or lost under the condition of link quality reduction or instability, and the AP will frequently get offline and unavailable due to the only detection of a keep-alive message or a retransmission response message within the heartbeat keep-alive period, which causes serious impact on user experiences. In order to avoid the condition, in the embodiment, the maximum permissible heartbeat keep-alive failure number is set by the setting module 501, and link keep-alive between the AC and the AP is detected by virtue of the maximum permissible heartbeat keep-alive failure number and the heartbeat keep-alive period.

The maximum permissible heartbeat keep-alive failure number is applicable to both the AC and the AP, that is, the maximum permissible heart keep-alive failure number set on the AC and the AP may be kept consistent, and the same judgment standard is adopted on both sides.

During specific setting procedure of the maximum permissible heartbeat keep-alive failure number, a network condition during practical networking and a time length for the re-access of the AP may be taken into consideration. If the maximum permissible heartbeat keep-alive failure number is set to be excessively large, a time length for the AC/AP to detect an offline state of the opposite end is increased; and if the maximum permissible heartbeat keep-alive failure number is set to be excessively small, a failure that the AP frequently gets offline due to link quality reduction cannot be eliminated. In an example embodiment of the disclosure, the maximum permissible heartbeat keep-alive failure number is set to be 3 to 5.

Then, the detection module 502 detects link keep-alive between the AC and the AP based on the maximum permissible heartbeat keep-alive failure number by virtue of the heartbeat message or message retransmission.

For an AC side, the AC can judge whether the AP is offline or not in both heartbeat message and message retransmission manners; and for an AP side, the AP can judge whether the AP is offline or not by virtue of message retransmission.

A detection process of the embodiment is described with reference to three link detection manners, including the adoption of the heartbeat message and message retransmission manners by the AC and the adoption of the message retransmission manner by the AP, in detail.

Specifically, when a first link detection manner (the AC performs link detection by virtue of the heartbeat message) is adopted, the detection module 502 sets a heartbeat keep-alive period, detects whether the AC receives the heartbeat message transmitted by the AP or not within the heartbeat keep-alive period, clears a heartbeat keep-alive failure number if the AC receives the heartbeat message transmitted by the AP, and restarts heartbeat keep-alive detection of a new round.

The detection module 502 adds 1 to the heartbeat keep-alive failure number if the AC does not receive the heartbeat message transmitted by the AP; when the heartbeat keep-alive failure number reaches the maximum permissible heartbeat keep-alive failure number, determines that heartbeat keep-alive fails and the AP is offline; and when the heartbeat keep-alive failure number does not reach the maximum permissible heartbeat keep-alive failure number, continues performing heartbeat keep-alive detection within the maximum permissible heartbeat keep-alive failure number. The process is cyclically executed.

When a second link detection manner (the AC performs link detection by virtue of message retransmission) is adopted, the detection module 502 is configured to set the heartbeat keep-alive period; transmit a first request message to the AP by the AC, and set an initial retransmission timer; judge whether the AC receives a first response message returned by the AP or not within a time length of the retransmission timer; if the AC receives the first response message returned by the AP within the time length of the retransmission timer, determine that heartbeat keep-alive is normal; otherwise double the time length of the retransmission timer and judge whether the doubled time length is greater than a maximum retransmission interval or not, the maximum retransmission interval=(the heartbeat keep-alive period*the maximum permissible heartbeat keep-alive failure number)/2; if the doubled time length is greater than the maximum retransmission interval, determine that heartbeat keep-alive fails and the AP is offline; otherwise reset the retransmission timer and retransmit the first request message to the AP by the AC, and return to judge whether the AC receives the first response message returned by the AP or not within the time length of the retransmission timer. The corresponding processes are sequentially executed to finish detecting link keep-alive between the AC and the AP.

When a third link detection manner (the AP performs link detection by virtue of message retransmission) is adopted, the detection module 502 sets the heartbeat keep-alive period; transmits a second request message to the AC by the AP, and sets the initial retransmission timer; judges whether the AP receives a second response message returned by the AC or not within the time length of the retransmission timer; if the AP receives the second response message returned by the AC within the time length of the retransmission timer, determines that heartbeat keep-alive is normal; otherwise doubles the time length of the retransmission timer and judges whether the doubled time length is greater than the maximum retransmission interval or not, the maximum retransmission interval=(the heartbeat keep-alive period*the maximum permissible heartbeat keep-alive failure number)/2; if the doubled time length is greater than the maximum retransmission interval, determines that heartbeat keep-alive fails and the AC is offline; otherwise resets the retransmission timer and retransmits the second request message to the AC by the AP, and returns to judge whether the AP receives the second response message returned by the AC or not within the time length of the retransmission timer. The corresponding processes are sequentially executed to finish detecting link keep-alive between the AC and the AP.

By the detection method and device for link keep-alive between the AC and the AP according to the embodiment of the disclosure, the maximum permissible heartbeat keep-alive failure number is set, and the maximum retransmission interval is set for link keep-alive detection between the AC and the AP based on the maximum permissible heartbeat keep-alive failure number and the heartbeat keep-alive period, so that the problem that the AP frequently gets offline and frequently re-accesses the AP due to link quality reduction to seriously impact user experiences can be effectively solved.

The above is only the example embodiment of the disclosure and not intended to limit the patent scope of the disclosure, and any equivalent structure or flow transformation made by virtue of contents of the specification and drawings of the disclosure or direct or indirect application of the contents to other related technical fields shall fall within the scope of protection as defined by the appended claims of the disclosure.

What is claimed is:

1. A detection method for link keep-alive between an Access Controller (AC) and an Access Point (AP), comprising Setting, by the AP or AC, a maximum permissible heartbeat keep-alive failure number; and Performing, by the AP or AC, link keep-alive detection between the AC and the AP based on the maximum permissible heartbeat keep-alive failure number by virtue of a heartbeat message or message retransmission.

2. The method according to claim 1, wherein performing, by the AC, link keep-alive detection between the AC and the AP based on the maximum permissible heartbeat keep-alive failure number by virtue of the heartbeat message comprises:

setting a heartbeat keep-alive period;

detecting whether the AC receives the heartbeat message transmitted by the AP or not within the heartbeat keep-alive period;

if the AC receives the heartbeat message transmitted by the AP within the heartbeat keep-alive period, clearing a heartbeat keep-alive failure number, restarting heartbeat keep-alive detection of a new round, otherwise adding 1 to the heartbeat keep-alive failure number;

when the heartbeat keep-alive failure number reaches the maximum permissible heartbeat keep-alive failure number, determining that heartbeat keep-alive fails and the AP is offline; and when the heartbeat keep-alive failure number does not reach the maximum permissible heartbeat keep-alive failure number, continuing performing heartbeat keep-alive detection within the maximum permissible heartbeat keep-alive failure number.

3. The method according to claim 1, wherein performing, by the AC, link keep-alive detection between the AC and the AP based on the maximum permissible heartbeat keep-alive failure number by virtue of message retransmission comprises:

setting a heartbeat keep-alive period;

transmitting, by the AC, a first request message to the AP, and setting an initial retransmission timer;

judging whether the AC receives a first response message returned by the AP or not within a time length of the retransmission timer, and if the AC receives the first response message returned by the AP within the time length of the retransmission timer, determining that heartbeat keep-alive is normal; otherwise doubling the time length of the retransmission timer, judging whether the doubled time length is greater than a maximum retransmission interval or not, wherein the maximum retransmission interval=(the heartbeat keep-alive period*the maximum permissible heartbeat keep-alive failure number)/2; if the doubled time length is greater than the maximum retransmission interval, determining that heartbeat keep-alive fails and the AP is offline; otherwise resetting, by the AC, the retransmission timer and retransmitting the first request message to the AP, and returning to the step of judging whether the AC receives the first response message returned by the AP or not within the time length of the retransmission timer.

4. The method according to claim 1, wherein performing, by the AP, link keep-alive detection between the AC and the AP based on the maximum permissible heartbeat keep-alive failure number by virtue of the heartbeat message comprises: setting a heartbeat keep-alive period;

transmitting, by the AP, a second request message to the AC, and setting an initial retransmission timer;

judging whether the AP receives a second response message returned by the AC or not within the time length of the retransmission timer, and if the AP receives the second response message returned by the AC within the time length of the retransmission timer, determining that heartbeat keep-alive is normal; otherwise doubling the time length of the retransmission timer, judging whether the doubled time length is greater than the maximum retransmission interval or not, wherein the maximum retransmission interval=(the heartbeat keep-alive period*the maximum permissible heartbeat keep-alive failure number)/2; if the doubled time length is greater than the maximum retransmission interval, determining that heartbeat keep-alive fails and the AC is offline; otherwise resetting, by the AP, the retransmission timer and retransmitting the second request message to the AC, and returning to the step of judging whether the AP receives the second response message returned by the AC or not within the time length of the retransmission timer.

5. The method according to claim 2, wherein the heartbeat keep-alive period is 30 to 80 seconds; and the maximum permissible heartbeat keep-alive failure number is 3 to 5.

6. An Access Controller (AC), comprising:

a setting module, coupled with a detection module and configured to set a maximum permissible heartbeat keep-alive failure number; and the detection module, coupled with the setting module and configured to perform link keep-alive detection between the AC and the AP based on the maximum permissible heartbeat keep-alive failure number by virtue of a heartbeat message or message retransmission.

7. The Access Controller according to claim 6, wherein the detection module, coupled with the setting module, is further configured to set a heartbeat keep-alive period; detect whether the AC receives the heartbeat message transmitted by the AP or not within the heartbeat keep-alive period; if the AC receives the heartbeat message transmitted by the AP within the heartbeat keep-alive period, clear a heartbeat keep-alive failure number and restart heartbeat keep-alive detection of a new round; otherwise add 1 to the heartbeat keep-alive failure number; when the heartbeat keep-alive failure number reaches the maximum permissible heartbeat keep-alive failure number, determine that heartbeat keep-alive fails and the AP is offline; and when the heartbeat keep-alive failure number does not reach the maximum permissible heartbeat keep-alive failure number, continue performing heartbeat keep-alive detection within the maximum permissible heartbeat keep-alive failure number.

8. The Access Controller according to claim 6, wherein the detection module, coupled with the setting module, is further configured to set the heartbeat keep-alive period; transmit a first request message to the AP by the AC, and set an initial retransmission timer; judge whether the AC receives a first response message returned by the AP or not within a time length of the retransmission timer; if the AC receives the first response message returned by the AP within the time length of the retransmission timer, determine that heartbeat keep-alive is normal; otherwise double the time length of the retransmission timer and judge whether the doubled time length is greater than a maximum retransmission interval or not, wherein the maximum retransmission interval=(the heartbeat keep-alive period*the maximum permissible heartbeat keep-alive failure number)/2; if the doubled time length is greater than the maximum retransmission interval, determine that heartbeat keep-alive fails and the AP is offline; otherwise reset the retransmission timer and retransmit the first request message to the AP by the AC, and return to judge whether the AC receives the first response message returned by the AP or not within the time length of the retransmission timer.

9. The Access Controller according to claim 7, wherein the heartbeat keep-alive period is 30 to 80 seconds; and the maximum permissible heartbeat keep-alive failure number is 3 to 5.

10. The method according to claim 3, wherein the heartbeat keep-alive period is 30 to 80 seconds; and the maximum permissible heartbeat keep-alive failure number is 3 to 5.

11. The method according to claim 4, wherein the heartbeat keep-alive period is 30 to 80 seconds; and the maximum permissible heartbeat keep-alive failure number is 3 to 5.

12. The Access Controller according to claim 8, wherein the heartbeat keep-alive period is 30 to 80 seconds; and the maximum permissible heartbeat keep-alive failure number is 3 to 5.

* * * * *